United States Patent [19]
Cheek et al.

[11] Patent Number: 4,662,246
[45] Date of Patent: May 5, 1987

[54] MULTISTAGE PLANETARY FINAL DRIVE MECHANISM

[75] Inventors: Michael E. Cheek, Oswego; William C. Morris, Aurora, both of Ill.

[73] Assignee: Caterpillar Inc., Peoria, Ill.

[21] Appl. No.: 783,896

[22] Filed: Oct. 3, 1985

[51] Int. Cl.[4] .......................... F16H 3/44; F16H 57/10
[52] U.S. Cl. ....................... 74/789; 74/797; 74/730
[58] Field of Search .......... 74/789, 730, 797; 180/10, 9.62, 9.64

[56] References Cited

U.S. PATENT DOCUMENTS

| | | | |
|---|---|---|---|
| 1,998,376 | 4/1935 | Lundqvist | 74/789 |
| 2,357,742 | 9/1944 | Jeffrey | 180/43 |
| 2,430,359 | 11/1947 | Messinger | 308/234 |
| 2,597,854 | 5/1952 | Cross et al. | 74/789 X |
| 2,941,423 | 6/1960 | Armington et al. | 74/801 |
| 3,459,070 | 8/1969 | Holdeman | 74/705 |
| 3,517,975 | 6/1970 | Lonngren et al. | 308/227 |
| 4,040,312 | 8/1977 | Tappan et al. | 74/801 |
| 4,072,067 | 2/1978 | Benthake | 74/789 |
| 4,092,878 | 6/1978 | Campbell | 74/801 |
| 4,158,971 | 6/1979 | Szalai et al. | 74/801 |
| 4,271,725 | 6/1981 | Takao et al. | 74/730 |
| 4,275,616 | 6/1981 | Ehrlinger et al. | 74/730 |
| 4,380,274 | 4/1983 | Abraham et al. | 74/789 X |
| 4,417,485 | 11/1983 | Boor | 74/785 |

OTHER PUBLICATIONS

Caterpillar Tractor Co., Model 205, Excavator Parts Book, using Linde Aktiengesellschaft Final Drive--Model GK27, published about Aug. 1984.
"Catalogue GB-D 401 Slewing Rings", INA-Walzlager, Germany, publication date unknown.

Primary Examiner—Kenneth J. Dorner
Assistant Examiner—Dirk Wright
Attorney, Agent, or Firm—Charles E. Lanchantin, Jr.

[57] ABSTRACT

A compact multistage planetary final drive mechanism includes a housing structure and associated wheel rotatably mounted on a hollow spindle, and a planetary gear apparatus for driving the housing structure at a relatively high speed reduction ratio in response to rotation of an input shaft. The planetary gear apparatus includes a first stage cluster gear set operatively connected to a second stage planetary gear set. A plurality of planet gears of the planetary gear set are rotatably mounted on the spindle, a parking brake mechanism is mounted within the spindle, and a first trough is defined annularly about the spindle. A second trough is defined within the housing structure, first and second pairs of wire raceways are seated within the respective troughs, and a plurality of roller bearing elements are cross connected within the wire raceways to transmit thrust and radial loads from the wheel to the spindle. The cluster gear set includes a first ring gear and the planetary gear set includes a first ring gear and the planetary gear set includes a second ring gear, and these ring gears are connected to transmit torque to the case of the housing structure independently of a releasable cover.

3 Claims, 4 Drawing Figures

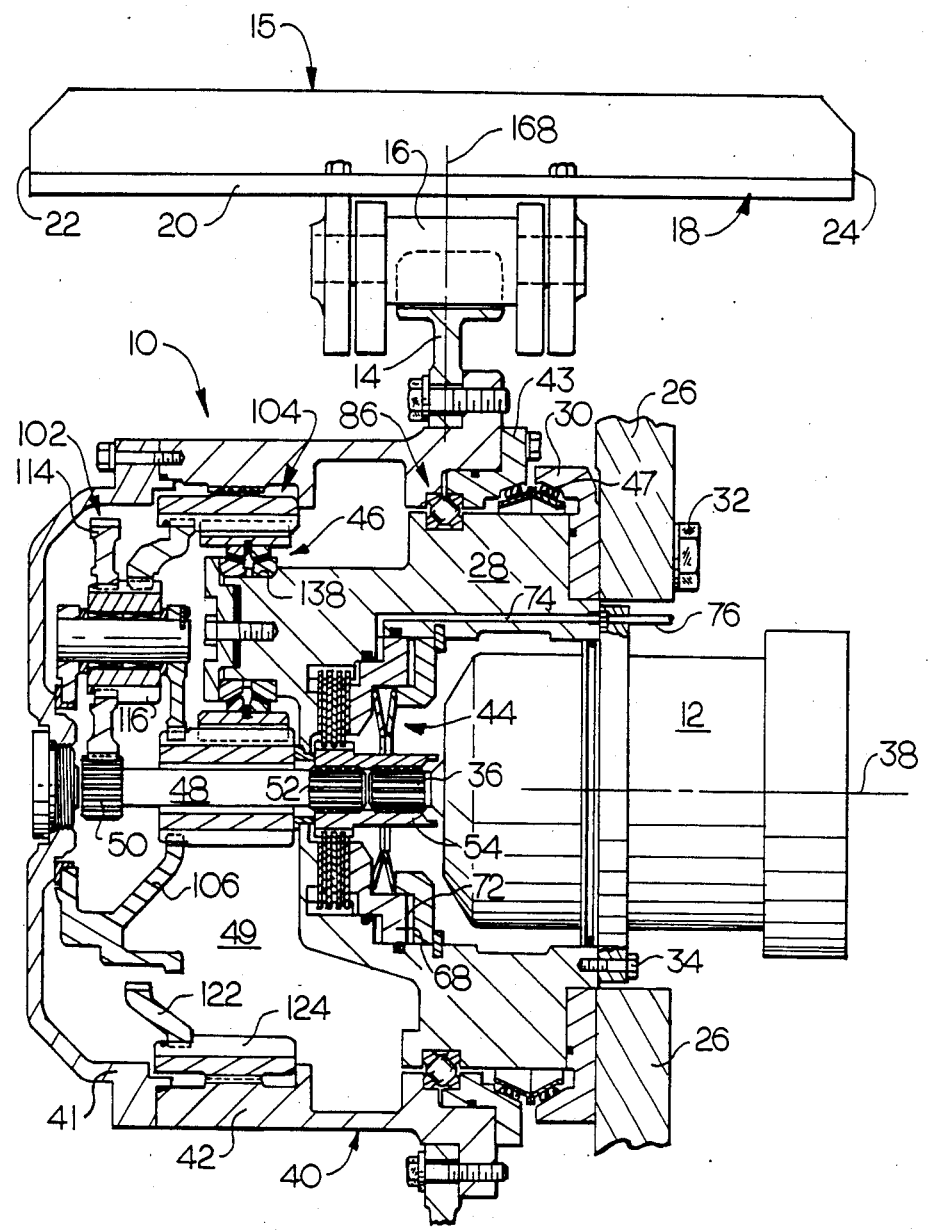

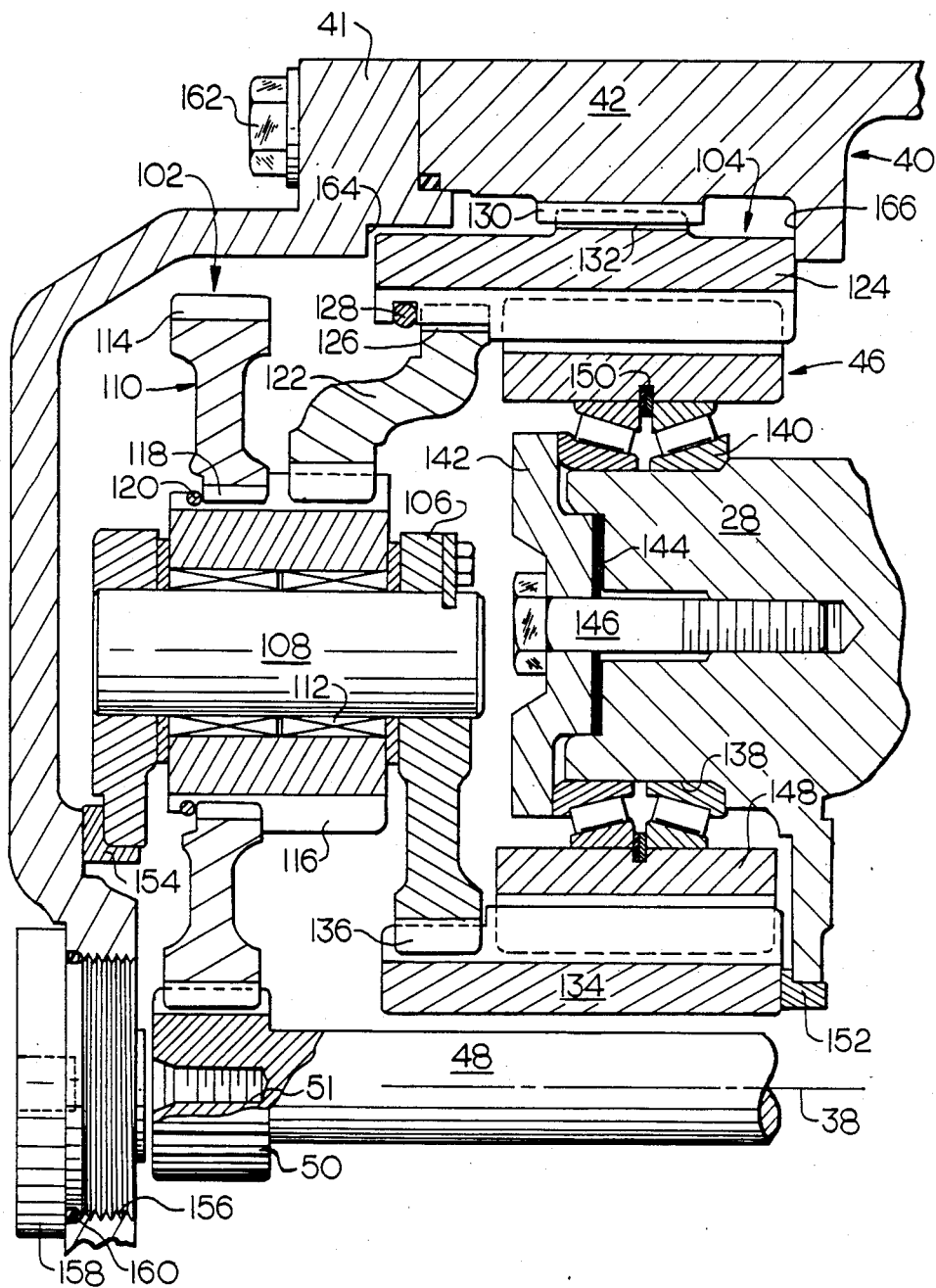

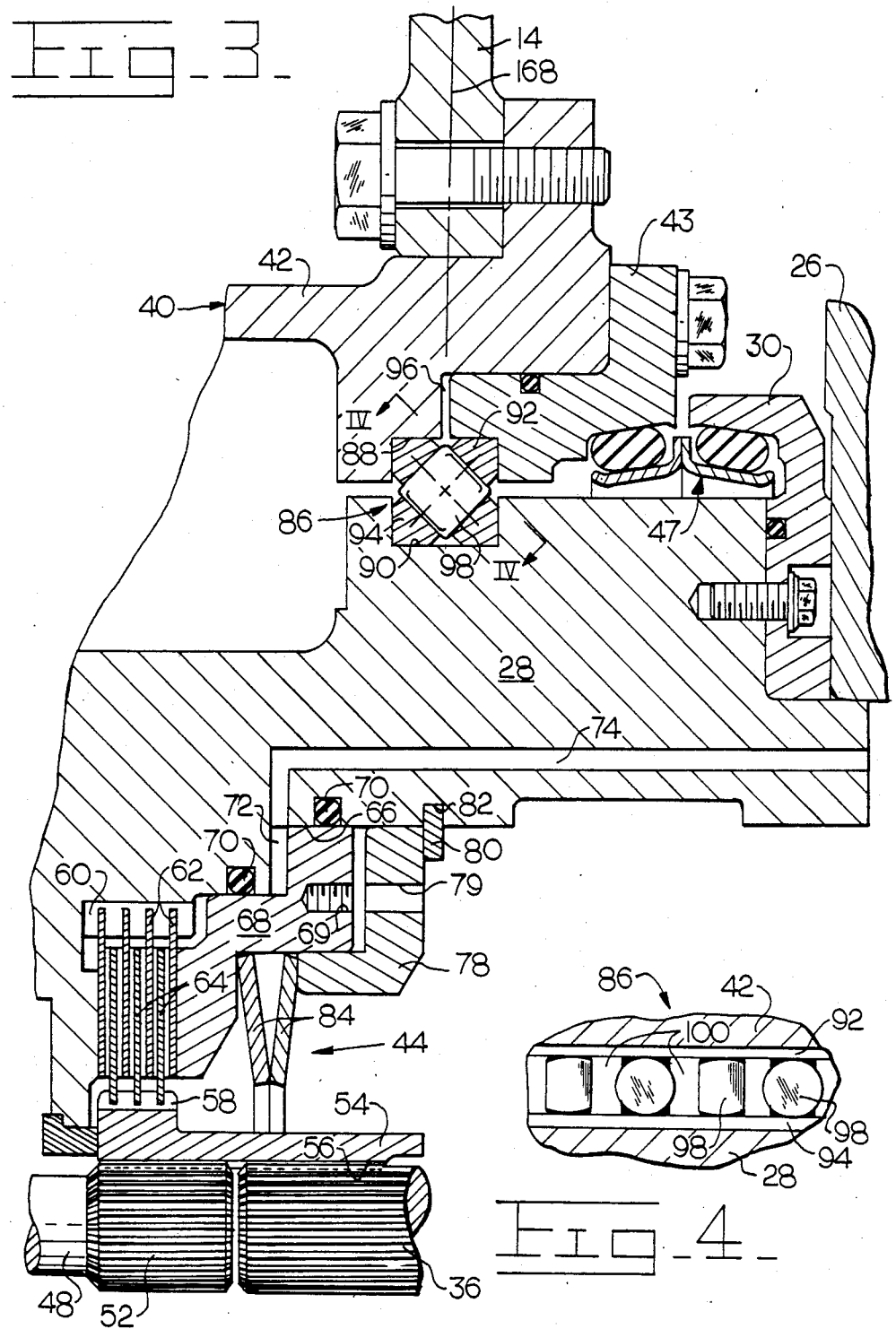

MULTISTAGE PLANETARY FINAL DRIVE MECHANISM

DESCRIPTION

TECHNICAL FIELD

This invention relates generally to a final drive mechanism, and more particularly relates to an especially compact multistage planetary final drive mechanism disposed between a motor and a wheel such as the driving sprocket of a track-type vehicle.

BACKGROUND ART

It is known to employ multistage planetary mechanisms within the rotating housing of heavy duty wheel and track-type vehicle final drives. Usually, two juxtaposed and interconnected simple planetary gear sets or stages have been used to provide the desired speed ratio reduction. However, such simple, two-stage systems are limited to a maximum practical reduction in the speed ratio range of about 50:1. Other final drive mechanisms have employed a planetary gear set with a single group of cluster planet gears; but these mechanisms are more limited in reduction capability than the dual planetary gear sets.

One final drive mechanism offered commercially for use in earthmoving excavators employs three interconnected planetary gear sets of the simple planetary type to provide a reduction in the speed ratio range of about 100:1. It further features an internal parking brake mounted within the supporting spindle, a driving motor mounted in part within the spindle, and a cross connected roller bearing assembly including inner and outer bearing containment races for rotatably supporting the rotating housing structure thereof. While such construction has proven to be very satisfactory, it has too many parts and is more complex than desired. In one embodiment, for example, the first stage has three planet gears, the second stage has four planet gears, and the third stage has five planet gears. Also, the input drive shaft cannot be conveniently removed therefrom for towing of the vehicle. Moreover, the cross connected roller bearing assembly thereof is relatively costly.

Accordingly, what is desired is a simple, rugged and compact multistage planetary final drive mechanism that will provide a speed ratio reduction in the range of about 100:1 or more and that will provide a conveniently serviceable mechanism as well. Specifically, the mechanism should be of a construction sufficient for allowing easy disconnect from the drive motor for towing purposes, and for allowing a simple service check of the planetary gear system inside the housing structure without disturbing more than the outer cover thereof. And, still further, the construction should minimize as much as possible the high costs associated with the use of relatively larger diameter bearing arrangements which desirably permits the motor to be at least partially contained within the supporting spindle for compactness along the transverse central axis thereof.

DISCLOSURE OF THE INVENTION

The present invention is directed to overcoming one or more of the above problems.

In one aspect of the invention there is provided a multistage planetary final drive mechanism having a hollow spindle, a housing structure including a case and an outer cover releasably secured thereto rotatably mounted thereon, an input shaft extending through the hollow spindle along the central axis thereof, and a planetary gear apparatus for driving the housing structure at a preselected reduced speed which includes a first stage cluster gear set including a planet and a plurality of cluster planet gears mounted on the planet carrier and individually defining a first planet gear and a smaller diameter second planet gear and a second stage planetary gear set including a sun gear driven by the planet carrier of the cluster gear set. The cluster gear set is effective to transmit torque directly to the case independently of the cover and to the planetary gear set upon being driven by the input shaft, and the planetary gear set is effective to transmit torque to the case of the housing structure while reacting against the hollow spindle.

In another aspect of the invention, a multistage planetary final drive mechanism includes a housing structure including a generally cylindrical case and an outer cover releasably connected thereto rotatably mounted on a hollow spindle along a central axis, and a planetary gear apparatus having a ring gear connected for joint rotation with the case, a plurality of planet gears rotatably connected to the hollow spindle and intermeshing with the ring gear, a secondary sun gear intermeshing with the planet gears, a planet carrier connected to the secondary sun gear, a primary sun gear that serves as the input, and means including a plurality of cluster planet gears for delivering torque to the planet carrier and a second ring gear for delivering torque to the case of the housing structure in response to rotation of the primary sun gear.

Preferably, the instant planetary final drive mechanism features a first stage cluster gear set having a first sun gear driven by the input shaft, a plurality of cluster planet gears mounted on a first planet carrier, and a first ring gear. Connected thereto is a second stage planetary gear set having a second sun gear driven by the first planet carrier, a plurality of second planet gears mounted on the hollow spindle, and a second ring gear, with both ring gears being connected to transmit torque directly to and to rotate with the case of the housing structure independently of the releasable outer cover.

In a further aspect of the invention, a planetary final drive mechanism includes a housing structure rotatably mounted on a hollow spindle, an input shaft extending generally along a central axis through the hollow spindle, a planetary gear apparatus for driving the housing structure at a preselected speed reduction ratio in response to rotation of the input shaft. Advantageously, the housing structure defines a first trough, the hollow spindle defines a second trough, a first pair of wire raceways are seated in the first trough, a second pair of wire raceways are seated in the second trough, and a plurality of roller bearing elements are adapted to roll against the wire raceways in cross connected relationship in order to transmit thrust in opposed directions and high radial loads. Preferably, the housing structure includes a case and a retainer releasably connected thereto so as to define the first trough therebetween in order to better receive the first pair of wire raceways and the roller bearing elements at assembly.

BRIEF DESCRIPTION OF THE DRAWINGS

FIG. 1 is a diagrammatic, elevational, sectional view of the multistage planetary final drive mechanism of the present invention in a driving relationship with a sprocket wheel and endless track chain of a track-type vehicle.

FIG. 2 is an enlarged fragmentary sectional view of the outer portion of FIG. 1 to better illustrate details of the planetary gear apparatus.

FIG. 3 is an enlarged fragmentary sectional view of the inner portion of FIG. 1 to better illustrate details of the roller bearing assembly support and the internal parking brake mechanism.

FIG. 4 is an oblique, fragmentary view as taken along line IV—IV of FIG. 3 to better show details of the cross connected roller bearing assembly.

BEST MODE FOR CARRYING OUT THE INVENTION

Referring initially to FIG. 1, a multistage planetary final drive mechanism 10 is illustrated which is driven by a conventional hydraulically powered motor 12, and is adapted to drive a sprocket wheel 14 of a track-type vehicle 15. Preferably, the hydraulic motor is of the fixed displacement, axial piston type with a maximum output speed of about 3,000 rpm. In the instant embodiment the sprocket wheel engages the track pins 16 of a typical endless track chain 18 which has a plurality of track shoes 20 thereon. Advantageously, the motor and final drive mechanism are compactly located transversely within the outer and inner edges 22 and 24 of the track shoes in relatively protected locations.

The vehicle 15 has a supporting main frame 26, and the final drive mechanism 10 includes a hollow spindle or fixed wheel support 28 and associated annular seal retainer 30 which are releasably secured to the main frame by a plurality of fasteners or bolts 32 which pass therethrough and are screwthreadably received in the spindle. The motor 10 is releasably secured to the spindle by a plurality of fasteners or bolts 34, and an externally splined output shaft 36 thereof is thereby arranged along a transversely oriented, horizontal central axis 38. The spindle not only fixedly supports the motor, but rotatably supports a housing structure 40 and the sprocket wheel 14 releasably secured thereto. In general, the housing structure 40 has three major parts including an outer cover 41, a generally cylindrical case 42, and an inner seal and bearing retainer 43. Furthermore, the spindle supports a parking brake mechanism 44 therewithin, and provides the support and reaction for a two-stage planetary gear means or apparatus identified generally by the reference number 46. An annular seal ring assembly 47 is located between the fixed retainer 30 and the rotating retainer 43 to effectively define a sealed chamber 49 with the housing structure.

A floating input pinion shaft 48 having an axially outer primary sun gear 50, an outwardly facing blind screwthreaded bore 51, and an axially inner external spline coupling 52 is arranged along the central axis 38. As is shown best in FIG. 3, a tubular adapter member 54 having an internal spline 56 and an external spline 58 is used to interconnect the spline coupling 52 of the input shaft with the splined output shaft 36 of the motor 12.

Referring now to the parking brake mechanism 44 shown more clearly in FIG. 3, it may be noted to include an internal spline 60 defined within the hollow spindle 28, a plurality of annular plates 62 connected to the internal spline, and a plurality of annular discs 64 with the usual grooved friction material thereon. The annular discs 64 are interleaved with the plates and are connected to the external spline 58 of the adapter member 54. The spindle also defines an inwardly facing stepped counterbore 66 which is concentrically arranged along the central axis 38 and is adapted to receive a stepped annular piston 68 having a plurality of inwardly facing blind threaded bores 69 therein. Two annular seal assemblies 70 of the usual type are seated within the spindle and engage the piston to define an annular chamber 72 between the spindle and the piston. As shown in FIG. 1, an internal passage 74 in the spindle is in open communication with an external conduit 76 for selectively pressurizing the chamber 72 with hydraulic fluid. This causes the piston to travel to the right when viewing the drawings against an end plate 78 having a plurality of openings 79 therethrough. The end plate is releasably secured in place by a retaining ring 80 coupled within an annular groove 82 in the spindle. A pair of Belleville compression springs 84 are arranged in back-to-back relation between the piston and the end plate, and are effective to clamp the plates and discs of the parking brake mechanism together by urging the piston to the left when viewing the drawings in the absence of hydraulic pressure in the chamber. This holds the adapter member 54, the motor output shift 36, and the input shaft 48 against rotation.

The final drive mechanism 10 also features a wire raceway, crossed roller bearing assembly 86 for rotatably mounting the housing structure 40 on the hollow spindle 28 and for effectively removing all loads on the sprocket wheel 14 from the planetary gear apparatus 46. More specifically, the housing structure defines a radially inwardly facing annular trough 88 and the spindle defines a radially outwardly facing annular trough 90. A pair of outer rings or wire raceways 92 are releasably disposed within the outer trough 88 and another pair of inner rings or wire raceways 94 are releasably disposed within the inner trough 90. Preferably, the wire raceways are made of through hardened roller bearing steel and have a generally triangular cross section. They also are formed into a substantially closed circle from straight stock, and so have an angled joint, not shown. While the inner wire raceways can be opened slightly in order to fit over the larger diameter portion of the spindle during assembly, the outer wire raceways are simply installed axially into the trough 88 during assembly because the case 42 and the seal and bearing retainer 43 are separable at a transversely oriented annular joint 96 located centrally of the trough. A substantial plurality of generally cylindrical roller bearing elements 98 are installed around the periphery of the wire raceways with their axes alternately disposed in criss-crossing relation as can be visualized by reference to FIG. 4. These angularly related or crossed axis roller bearing elements effectively oppose radial as well as axial thrust forces in both directions. FIG. 4 also illustrates a plurality of spacer elements 100 which are preferably made of plastic material such as nylon, and which are appropriately contoured to intimately fit between the cross arranged roller bearing elements.

Turning now to the two-stage planetary gear apparatus 46 shown best in FIG. 2, it may be noted to include a first stage cluster gear set 102 and a second stage single planetary gear set 104. The cluster gear set includes a planet carrier 106 having three planet shafts 108 secured thereto, and a cluster planet gear 110 rotatably mounted on each of the planet shafts through associated roller or needle bearing assemblies 112. Each of the cluster planet gears has a relatively narrow and large diameter first planet gear 114 releasably secured to a wide and relatively small diameter second plant gear 116 through a spline coupling joint 118 and a conventional retaining ring 120 seated on the second gear. The second planet gears 116 are adapted to intermesh with and to roll within a cluster reaction ring gear 122, and this reacting ring gear is connected for joint rotation with the case 42 via a second ring gear 124. The reaction ring gear 122 and the second ring gear 124 are interconnected through a spline coupling joint 126 and retaining ring 128 seated within the second ring gear. An integral spline 130 is formed within the case 42, and an external spline 132 is formed generally centrally of the second ring gear, and the intermeshing connection of these two splines allows a preselected minimum amount of play or self-adjustment to torque loads therethrough.

The second stage planet gear set 104 shares or also transmits torque through the second ring gear 124, and includes a secondary sun gear 134 which encircles the input shaft 48 and is driven by the planet carrier 106 via a spline coupling joint 136. Advantageously, three planet shafts 138 are integrally formed on the distal end of the hollow spindle 28 and serve as a fixed second planet carrier, and three pairs of opposed tapered roller bearing assemblies 140 are mounted thereon. The proper setting of these bearing assemblies is obtained by a retaining plate 142 and associated shim pack 144 releasably secured to the spindle planet shafts as by a fastener or bolt 146 screwthreadably received in the end of each planet shaft. A secondary planet gear 148 is rotatably mounted on each of the pairs of bearing assemblies 140, and is held in an axially centered position by a retaining ring 150 seated within the secondary planet gear and extending radially inwardly between the pairs of bearing assemblies.

Axially inward movement of the secondary sun gear 134 is limited by a thrust ring 152 secured to the spindle 28 and having a generally L-shaped cross section. A thrust ring 154 of corresponding cross section is secured to the outer end of the planet carrier 106 so that axially outward movement of the planet carrier and the secondary sun gear is also limited by contact with the cover 41. The cover has a threaded access bore 156 therethrough on the central axis 38, and a plug 158 is screwthreadably inserted into the bore with an annular sealing member 160 disposed therebetween.

The cover 41 is generally of a flat C-shape in cross section and is releasably secured to the case 42 by a plurality of fasteners or bolts 162 extending through the cover and into screwthreaded engagement with the case. The cover defines an annular inwardly facing shoulder 164 and the case defines an annular outwardly facing shoulder 166, and the second ring gear 124 is axially entrapped between these two shoulders with a preselected degree of freedom.

Industrial Applicability

In operation, the output shaft 36 of the hydraulic motor 12 can be driven at substantially any speed up to about 3,000 rpm. Assuming that the parking brake mechanism is disengaged, as by the introduction of sufficient fluid pressure into the chamber 72, rotation of the motor drives the adapter member 54, the input shaft 48 and the primary sun gear 50 at the same speed. The number of gear teeth and the reduction ratios obtained with one embodiment of the planetary gear apparatus 46 are shown by the charts immediately below:

| Number of Gear Teeth | | |
|---|---|---|
| Sun Gear | ($S_1$) | 50: 14 teeth |
| Planet Gear | ($P_1$) | 114: 60 teeth |
| Planet Gear | ($P_2$) | 116: 15 teeth |
| Ring Gear | ($R_1$) | 122: 58 teeth |
| Sun Gear | ($S_2$) | 134: 12 teeth |
| Planet Gear | ($P_3$) | 148: 25 teeth |
| Ring Gear | ($R_2$) | 124: 66 teeth |

Reduction Ratio of First Stage Cluster Gear Set 102

$$-\frac{(NR_1)(NP_1)}{(NS_1)(NP_2)}$$

$$-\frac{(58)(60)}{(14)(15)} = -16.57$$

Reduction Ratio of Second Stage Planetary Gear Set 104

$$-\frac{(NR_2)}{(NS_2)}\left(1 + \frac{(NR_1)(NP_1)}{(NS_1)(NP_2)}\right)$$

$$-\frac{(66)}{(12)}\left(1 + \frac{(58)(60)}{(14)(15)}\right) = -96.64$$

Thus, the total speed ratio reduction is the sum of the individual stages, or is 113.21 for the instant example. If the motor output shaft 36 and sun gear 50 are rotated at 113.21 rpm, then the rotating housing 40 and the sprocket wheel 14 are driven at 1 rpm in a rotational direction opposite that of the motor. Also, the output torque from the cluster gear set 102 is divided such that about 86% is directed through a primary path from the planet carrier 106 to the secondary sun gear 134, and about 14% is directed through a secondary path from the planet gears 116 to the reaction ring gear 122.

Access to the planetary gear apparatus 46 by a mechanic out in the field is easy to achieve by removal of the cover 41 from the case 42 by screwthreaded release of the bolts 162. Note that no parts of the planetary gear apparatus 46 are secured to the cover and none are disturbed for such access. At this time the first stage cluster gear set 102 can be visually inspected from almost a radial direction, or can be axially removed for more specific inspection along with the second ring gear 124. The secondary sun gear 134 can also be removed if desired, and the planet gears 148 visually inspected also.

One other feature is that only the plug 158 needs to be screwthreadably released from the cover 41, and the input pinion shaft 48 pulled axially outwardly through the bore 156. Although not illustrated, a conventional tool can be inserted into the threaded bore 51 at the end of the shaft to ease such manual disassembly. This conveniently disconnects the drive motor 12 from the planetary gear apparatus 46 and allows the vehicle to be towed without any reverse power flow to the motor.

On the other hand, if it is desired to remove the entire planetary drive mechanism 10 from the vehicle main frame 26 it is only necessary to remove the bolts 32 and to disconnect the hydraulic conduits or lines therefrom. It is also easy to remove the drive motor 12 for inspection by release of the bolts 34; this provides immediate access to the parking brake mechanism 44 and various components thereof without having to open the cover 41 or to otherwise affect the planetary gear apparatus 46.

During assembly and/or disassembly of the parking brake mechanism 44 shown in FIG. 3, it is desirable to relieve the piston 68 from the mechanical loading of the Belleville springs 84 by inserting a plurality of bolts, not shown, through the openings 79 of the end plate 78 and into screwthreaded engagement with the bores 69 until the piston is moved inwardly and nested axially fully within the end plate. This allows more convenient alignment of the external spline 58 of the tubular adapter member 54 with the usual teeth of the discs 64.

The crossed roller bearing assembly 86 is desirably located in a plane 168 passing centrally through the sprocket 14 transverse to the central axis 38, and the trough 90 for receiving the bearing assembly is integrally formed in the one-piece hollow spindle 28. This single bearing asembly is more economical than the usual pair of spaced apart tapered roller bearings or the cross connected roller bearing assembly that does not incorporate wire raceways, and is conveniently assembled or disassembled because the outer housing structure trough 88 is separable at the joint 96. Also, by using separate wire raceways 92 and 194 looser tolerances of the mating parts can be permitted because the wire raceways can accommodate some misalignment.

It is contemplated that the cluster reaction ring gear 122 can be directly connected to either the cover 41 or the case 42, although not illustrated. The embodiment illustrated, however, has the advantage that there are no torque loads through the cover 41 and thus no torque loads through the joint between the cover and the case which could cause possible leakage thereat after extended service.

In view of the foregoing, it is apparent that the multistage planetary final drive mechanism 10 is simple, rugged, compact and highly serviceable. On the one hand it provides a higher speed reduction ratio than the usual double planetary gear set embodiments, which are generally limited to a 50:1 ratio, and on the other hand it provides about a 100:1 ratio corresponding to that of a triple planetary gear set without the larger number of parts and associated expense. Moreover, the planetary final drive mechanism 10 features a wire raceway, crossed roller bearing assembly 86 for rotatably mounting and supporting the wheel 14.

Other aspects, objects and advantages of this invention can be obtained from a study of the drawings, disclosure and the appended claims.

We claim:

1. In a multistage planetary final drive mechanism of the type having a housing structure including a case and an outer cover separable therefrom rotatably mounted on a hollow spindle, and an input shaft extending generally along a central axis through the hollow spindle, the improvement comprising:

planetary gear means for driving the housing structure at a relatively high preselected speed reduction ratio in response to rotation of the input shaft, the planetary gear means including a first stage cluster gear set including a planet carrier, a plurality of cluster planet gears mounted on the planet carrier and individually having a first planet gear and a second planet gear of smaller diameter than the first planet gear connected for conjoint rotation, and a first ring gear intermeshingly engaged with the second planet gears, and a second stage planetary gear set including a sun gear driven by the planet carrier of the cluster gear set, a second ring gear, and a plurality of further planet gears intermeshingly engaged with the second ring gear and the sun gear, the second ring gear being connected to the case by a spline joint and the first ring gear being connected to the second ring gear by another spline joint, the cluster gear set transmitting torque to the case independently of the cover via the first ring gear and to the planetary gear set in response to the first planet gear being driven by the input shaft, and the planetary gear set transmitting torque to the case via the second ring gear and reacting against the hollow spindle.

2. In a multistage planetary final drive mechanism of the type having a hollow spindle, a housing structure including a case and an outer cover releasably connected thereto rotatably mounted on the hollow spindle, and an input shaft extending generally along a central axis through the hollow spindle, the improvement comprising:

a first stage cluster gear set including a first sun gear driven by the input shaft, a first planet carrier, a plurality of cluster planet gears rotatably mounted on the first planet carrier and individually having a first gear driven by the first sun gear, and a second gear of smaller diameter than the first gear, and a first ring gear intermeshingly engaged with the second gear; and a second stage planetary gear set including a second sun gear connected for joint rotation with the first planet carrier, a second planet carrier, a plurality of second planet gears rotatably mounted on the second planet carrier, and a second ring gear intermeshingly engaged with the second planet gears, and wherein the second ring gear is releasably connected directly to the case and the first ring gear is releasably connected directly to the second ring gear independently of the outer cover.

3. In a planetary final drive mechanism of the type having a hollow spindle, a housing structure rotatably mounted on the hollow spindle, an input shaft extending generally along a central axis through the hollow spindle, a planetary gear apparatus for driving the housing structure at a preselected speed reduction ratio in response to rotation of the input shaft, the improvement comprising:

the housing structure including a case and a retainer separable at a joint and which define a radially inwardly facing annular trough thereat;

the hollow spindle being of one-piece integral construction and defining an integrally formed and radially outwardly facing annular trough;

a first pair of wire raceways seated in the radially inwardly facing annular trough;

a second pair of wire raceways seated in the radially outwardly facing annular trough; and a plurality of roller bearing elements adapted to roll against said wire raceways, the roller bearing elements being cross connected with respect to the wire raceways for transmitting thrust in opposed directions and high radial loads.

* * * * *